(12) United States Patent
Orrell et al.

(10) Patent No.: US 7,845,711 B2
(45) Date of Patent: Dec. 7, 2010

(54) QUICK-ATTACH/DETACH CAB FOR VEHICLE

(75) Inventors: Gary N. Orrell, Millbury, MA (US); Michael A. Orrell, Charlton, MA (US); Martin Robinson, Auburn, MA (US); Jeremy Cirota, Charlton, MA (US)

(73) Assignee: Curtis Industries LLC, Worcester, MA (US)

( * ) Notice: Subject to any disclaimer, the term of this patent is extended or adjusted under 35 U.S.C. 154(b) by 0 days.

(21) Appl. No.: 12/080,990

(22) Filed: Apr. 8, 2008

(65) Prior Publication Data

US 2008/0265609 A1     Oct. 30, 2008

Related U.S. Application Data

(60) Provisional application No. 60/923,313, filed on Apr. 13, 2007.

(51) Int. Cl.
*B62D 33/06* (2006.01)
*B62D 27/06* (2006.01)

(52) U.S. Cl. ............ 296/190.03; 296/96.21; 296/146.16; 296/218; 296/92

(58) Field of Classification Search ........ 296/218, 296/77.1, 79, 191, 103, 102, 96.21, 84.1, 296/146.16, 76, 146.8, 146.11, 92, 88, 37.1
See application file for complete search history.

(56) References Cited

U.S. PATENT DOCUMENTS

| | | | | |
|---|---|---|---|---|
| 4,072,338 A | * | 2/1978 | Lawrence et al. | 296/190.1 |
| 4,183,576 A | * | 1/1980 | Frymire | 296/212 |
| 4,346,932 A | * | 8/1982 | Iwata et al. | 296/218 |
| 4,351,560 A | * | 9/1982 | Kanou et al. | 296/218 |
| 4,950,006 A | * | 8/1990 | Lambke | 292/216 |
| 5,174,622 A | | 12/1992 | Gutta | 296/77.1 |
| 5,203,277 A | * | 4/1993 | Norman | 114/361 |
| 5,297,844 A | | 3/1994 | Haustein | 296/190.04 |

(Continued)

FOREIGN PATENT DOCUMENTS

JP     62-105718     5/1987

(Continued)

OTHER PUBLICATIONS

The International Search Report dated Aug. 15, 2008.

*Primary Examiner*—Dennis H Pedder
(74) *Attorney, Agent, or Firm*—Nields, Lemack & Frame, LLC

(57) ABSTRACT

Removable cab components and a removable cab assembly for a vehicle. A durable cab assembly is provided, which generally includes a roof, a windshield and a rear panel that is removably attachable to the vehicle. In certain embodiments, the roof, windshield and rear panel are separate components, each separately removably attachable to the vehicle. In certain embodiments, each component of the cab assembly is removably attachable to the roll cage of the vehicle without comprising the integrity of the roll cage. The attachment and detachment of the cab assembly can be carried out manually, by a single person, in a short period of time, without requiring separate tools. The invention is also directed to the windshield, roof and rear panel as individual components adapted for quick attachment/detachment to a vehicle, and a method of attaching or detaching cab components or a cab assembly.

9 Claims, 19 Drawing Sheets

U.S. PATENT DOCUMENTS

| | | | |
|---|---|---|---|
| 5,725,273 A * | 3/1998 | Vernon et al. | 296/218 |
| 5,732,965 A | 3/1998 | Willey | 280/288.4 |
| 5,967,586 A * | 10/1999 | Duffy et al. | 296/76 |
| 6,010,182 A * | 1/2000 | Townsend | 296/203.01 |
| 6,206,446 B1 | 3/2001 | Slayden | 296/77.1 |
| 6,254,166 B1 | 7/2001 | Willey | 296/78.1 |
| 6,439,645 B1 | 8/2002 | Pedersen | 296/161 |
| 6,484,914 B1 | 11/2002 | Willey | 224/413 |
| 6,530,617 B2 | 3/2003 | McElwee et al. | 296/77.1 |
| 6,543,830 B1 | 4/2003 | Stuck | 296/77.1 |
| 6,752,447 B2 | 6/2004 | Gagne | 296/92 |
| 6,786,526 B1 | 9/2004 | Blalock | 296/77.1 |
| 6,817,647 B1 | 11/2004 | Green | 296/77.1 |
| 6,866,322 B2 | 3/2005 | Willard | 296/107.01 |
| 6,974,175 B2 | 12/2005 | Willey | 296/78.1 |
| 7,044,530 B1 | 5/2006 | Hahne | 296/78.1 |
| 7,055,879 B2 * | 6/2006 | De Gaillard | 296/26.08 |
| 7,216,926 B2 * | 5/2007 | Hampel | 296/190.08 |
| 2002/0175534 A1 * | 11/2002 | Strong | 296/77.1 |
| 2005/0140176 A1 | 6/2005 | Hampel | 296/190.08 |
| 2006/0091702 A1 | 5/2006 | Essig | 296/218 |

FOREIGN PATENT DOCUMENTS

JP             362105718 A *     5/1987

* cited by examiner

QUICK-ATTACH/DETACH CAB FOR VEHICLE

This application claims priority of provisional patent application Ser. No. 60/923,313 filed on Apr. 13, 2007, the disclosure of which is hereby incorporated by reference.

BACKGROUND OF THE INVENTION

Motorized vehicles used for sport, recreation or utility, such as neighborhood electric vehicles (NEV'S, which can be street-legal), tractors, and other 2-wheel drive, 4-wheel drive, all-wheel drive capable vehicles, on or off-road, all terrain vehicles (ATV), sport utility vehicles and utility vehicles (UTV), have become extremely popular. Such vehicles typically have gasoline-powered engines and have three or four wheels designed for carrying one or more passengers in off-road terrain. UTV's, which generally are larger than traditional ATVs, but still much smaller than pickup trucks, are often intended for towing, carrying cargo and plowing, although they do not have the power capabilities of larger trucks. UTV's are commonly used by golf courses, refineries, utilities, municipalities, and construction companies. Sport utility vehicles are a more powerful and faster version of the utility vehicle. Sport utility vehicles are generally used for trail and open country riding by hunters and pleasure riders. Engines in sport utility vehicles can range up to about 60 horsepower. Most sport utility vehicles have towing or plowing capabilities and also a cargo bed on the back. ATVs are frequently used by hunters for transportation to campsites, for transporting animal carcasses (often with the aid of a winch), etc. These types of vehicles generally include a vehicle chassis, one or more seats, a steering mechanism such as handlebars or a steering wheel, and a roll cage. The engine of an exemplary UTV delivers 30 horsepower, as compared to over 200 HP for a typical pickup truck, limiting the UTV's to lower maximum payloads and lower towing capacities. The electrical systems of UTV's and ATV's are also inferior in terms of power capability. The alternator of a typically pickup truck is capable of delivering 130 amps, allowing it to supply energy to high-power external attachments, such as winches, hydraulic snow plows, and the like. However, the alternators for traditional ATV's and UTV's are capable of delivering only about 15-40 amps.

As such vehicles become more popular, it is desirable to be able to offer removable cabs for such vehicles. Cabs offer environmental protection to the passengers, and quick and easy attachment and detachment of such cabs would provide clear advantages.

It is therefore an object of the present invention to provide quick attach/detach cab assembly for vehicles, especially off road vehicles, such as tractors, ATV's, sport utility vehicles and UTV'S.

SUMMARY OF THE INVENTION

The problems of the prior art have been overcome by the present invention, which provides removable cab components and a removable cab assembly for a vehicle. More specifically, a durable cab assembly is provided, which generally includes a roof, a windshield and a rear panel that is removably attachable to the vehicle. In certain embodiments, the roof, windshield and rear panel are separate components, each separately removably attachable to the vehicle. In certain embodiments, each component of the cab assembly is removably attachable to the roll cage of the vehicle without compromising the integrity of the roll cage. The attachment and detachment of the cab assembly in accordance with the invention can be carried out manually, by a single person, in a short period of time, without requiring separate tools. The invention is also directed to the windshield, roof and rear panel as individual components adapted for quick attachment/detachment to a vehicle, and a method of attaching or detaching cab components or a cab assembly. A kit comprising, as individual components, a windshield, roof and rear panel, each having a fastening system for quick attachment/detachment from a vehicle, is also provided.

DETAILED DESCRIPTION OF THE INVENTION

Figure 1:
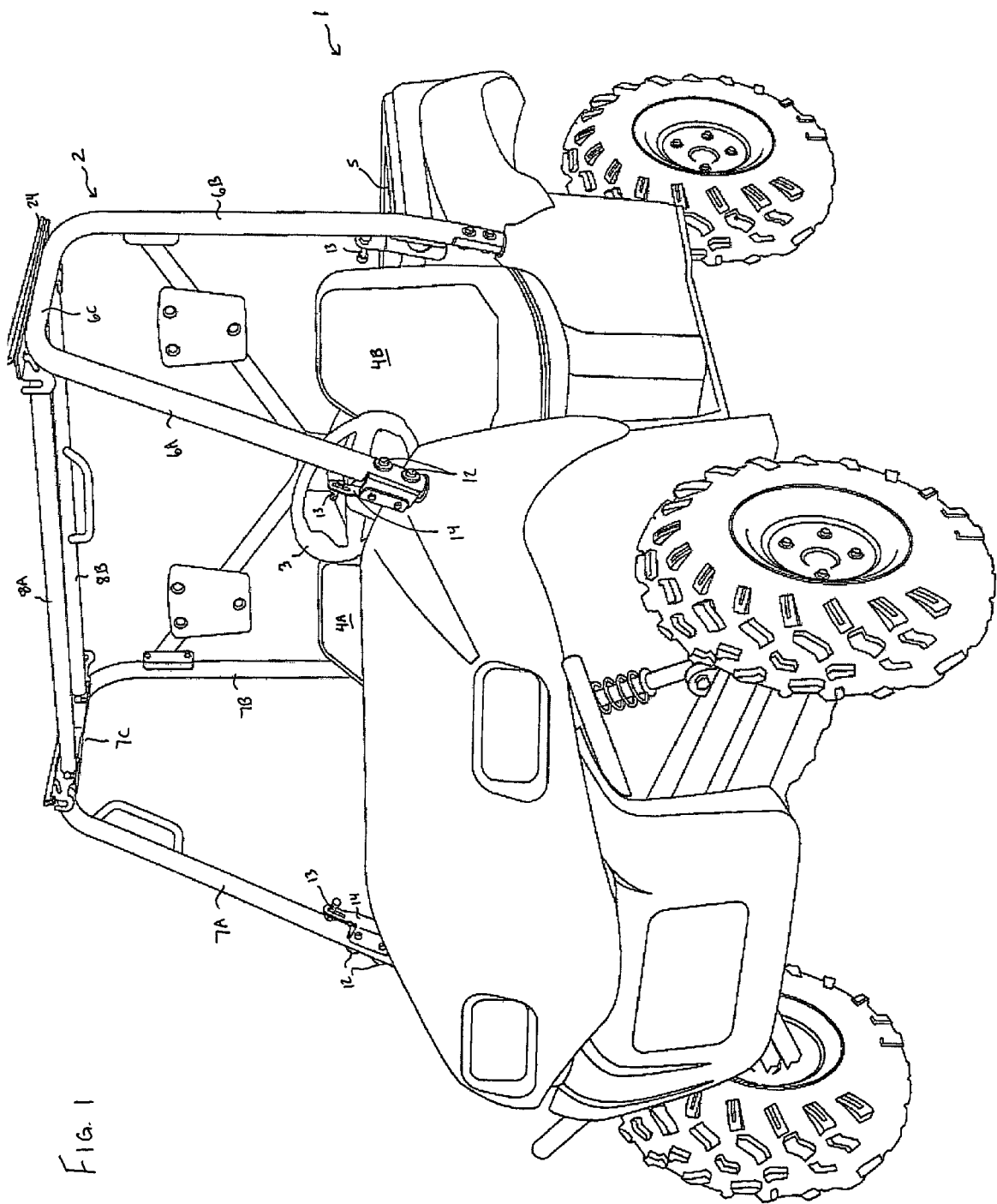
FIG. 1 is a perspective view of an off-road vehicle including attachments for attaching a windshield, roof and rear panel in accordance with certain embodiments.

Turning first to FIG. 1, there is shown an exemplary vehicle 1 on which the quick attach/detach cab assembly of the present invention can be used. It should be understood by those skilled in the art that the vehicle shown is for illustrative purposes only; other vehicle designs and configurations can be used and are within the scope of the present invention. Preferably the vehicle has a four-post roll over protection structure (ROPS) 2 or other suitable cage structure or the like. Exemplary vehicles that are commercially available include the Yamaha Rhino®, Kawasaki Mule®, Polaris Ranger®, John Deere Gator®, Club Car 4×4, Easy-Go 4×4, Cub Cadet 4×4, etc. The vehicle shown is motorized, includes four wheels (only three shown), a steering wheel 3, passenger seats 4A, 4B and a rear utility bed 5.

The roll over protection structure shown as exemplary includes driver's side front 6A and rear 6B substantially vertical posts, which, in the embodiment shown, are part of a single substantially U-shaped member having a top portion 6C. The base of the front 6A and rear 6b posts are attached to the vehicle in a conventional manner. Similar passenger side front 7A and rear 6B substantially vertical posts, which also are part of a single substantially U-shaped member having a top portion 7C are provided. The base of the front 7A and rear 7B posts are attached to the vehicle in a conventional manner. Top lateral members 8A, 8B extend between top portions 6C and 7C as shown. Other configurations are available. For example, the four substantially vertical posts can be separate posts and/or can be integrated with other members of the roll over protection structure or vehicle structure. It should be understood that the terms "roll over protection structure" and "roll cage" as used herein are interchangeable and can include any roll cage or other combination of structural members that extend from the vehicle and can protect the vehicle passengers from injury in the event of a roll over, whether certified or not. In preferred embodiments, the roll over protection structure serves as the support for the cab assembly.

In accordance with certain embodiments, the quick release fasteners used to couple the cab assembly to the vehicle may include a series of latches, slots and pins. A preferred latch is a rotary latch that is triggered by a striker pin, which engages respective latch cams in the rotary latches and slides back into the latch body along with the cam. The striker pins remain within the body of the latch, providing a strong and secure connection. No additional tools or manual manipulation is necessary to engage the striker pins in respective latches. Suitable latches include single actuation and dual actuating rotary latches. On opening, the latch cam rotates out of the body to disengage from the striker pin. Although rotary latches and striker pins are illustrated in the drawings, other latches are within the scope of the invention, such as sliding spring latches.

Because of the different style roll over protection structures available, the particular location of the fasteners can vary without departing from the spirit and scope of the invention. Latches shown on cab components could be instead located on the vehicle, and pins shown on the vehicle could instead be located on the cab components. Furthermore, depending on the size and weight of each cab component, and the nature of the latch used, a single latch or multiple latches (including more than the two latches per component as exemplified below) can be used to removably attach each component to the vehicle. An exemplary quick release fastening system will now be described.

Figure 6:
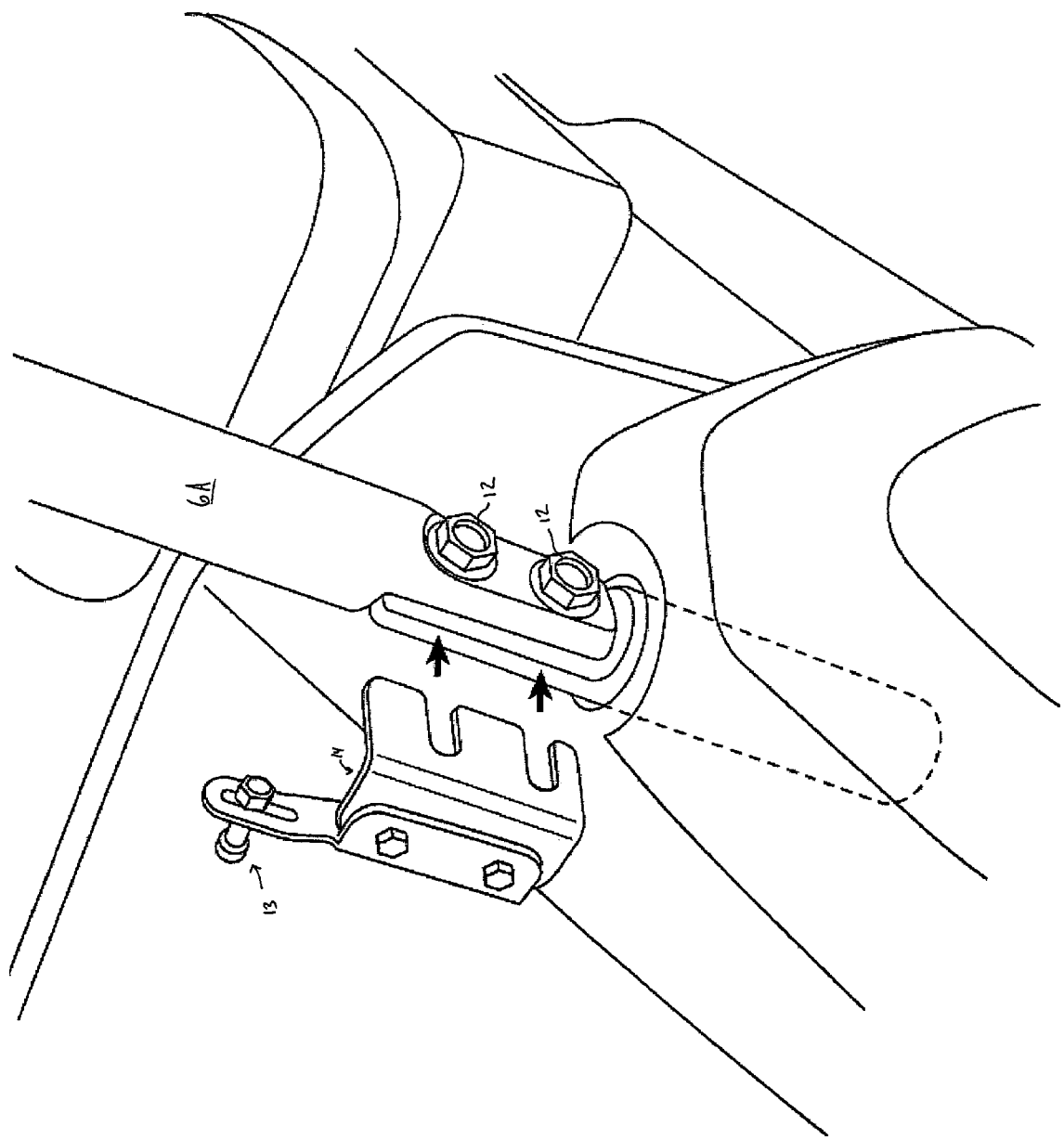
FIG. 6 is a perspective view of a striker pin and bracket assembly being attached to a post of a vehicle in accordance with certain embodiments.

Coupled near the base of each front post 6A, 7A and each rear post 6B, 7B is a striker pin 13. In order to maintain the integrity of the posts 6A, 6B, 7A, 7B, preferably each striker pin 13 is attached, via a respective bracket 14, using existing bolts 12 that attach the posts to the vehicle. Thus, referring to FIG. 6, the bolts 12 are loosened or removed, each bracket 14 (with suitable slots or holes to receive the bolts) is placed against a respective post, and the bolts are tightened or reinserted and tightened to secure the brackets to the posts and the posts to the vehicle. The brackets should be made of a rigid and durable material, such as mild steel, hard plastic or composites. Those skilled in the art will appreciate that although each striker pin 13 is shown having a cylindrical pin body and a pin head extending therefrom and having a larger diameter than the body, other configurations are possible and within the scope of the invention. The diameter and length of each pin body are configured to be received by a corresponding pin slot, or by a corresponding latch, as discussed in greater detail below. It is noted that when the pin is engaged by a latch, it is generally referred to as a striker pin, although the terms "striker pin" and "pin" can be used interchangeably, since in preferred embodiments the striker pin and pin can have the same or similar configuration.

Figure 7:
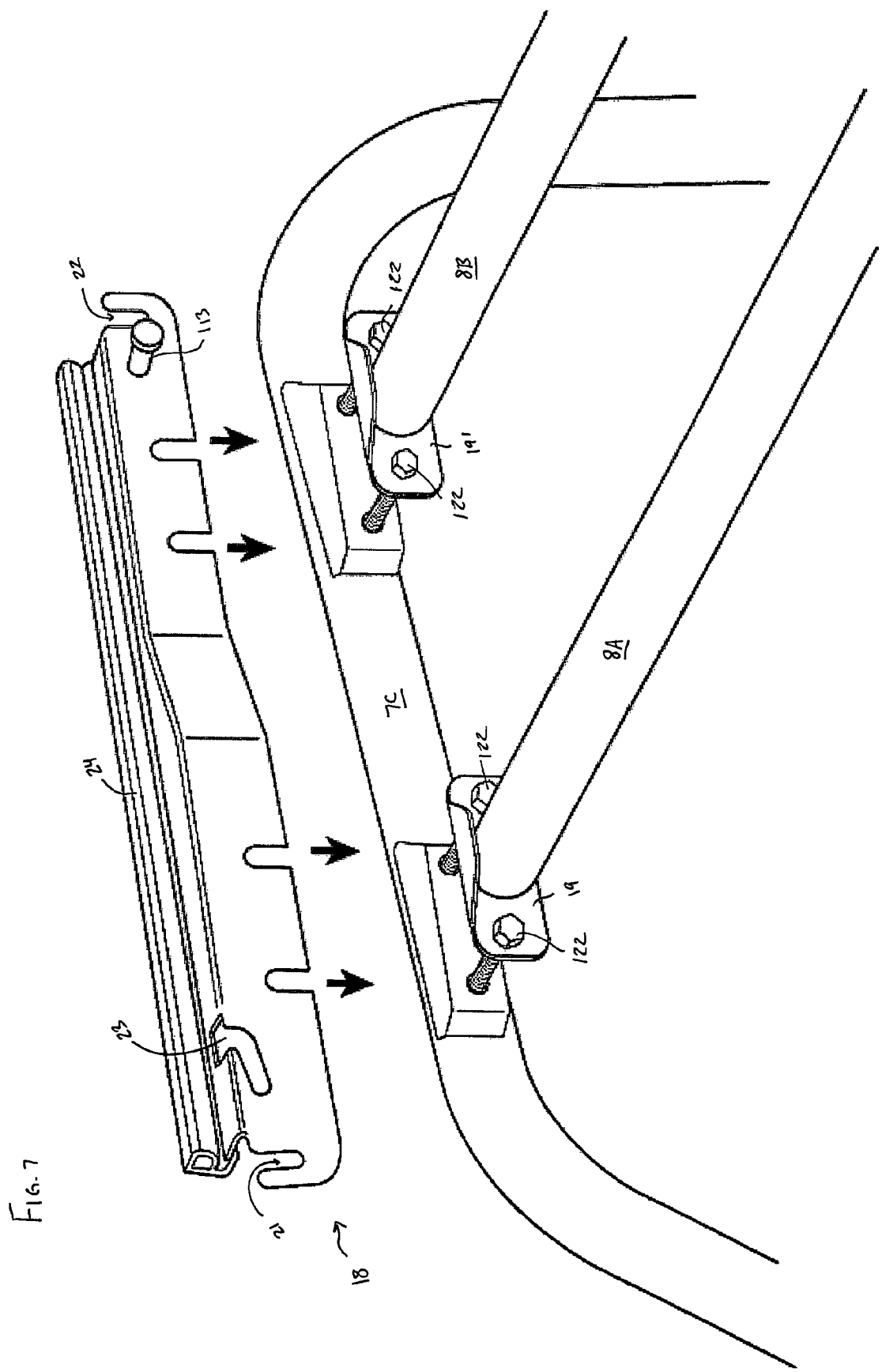
FIG. 7 is a perspective view of a first roof bracket being attached to a post of a vehicle in accordance with certain embodiments.
Figure 8:
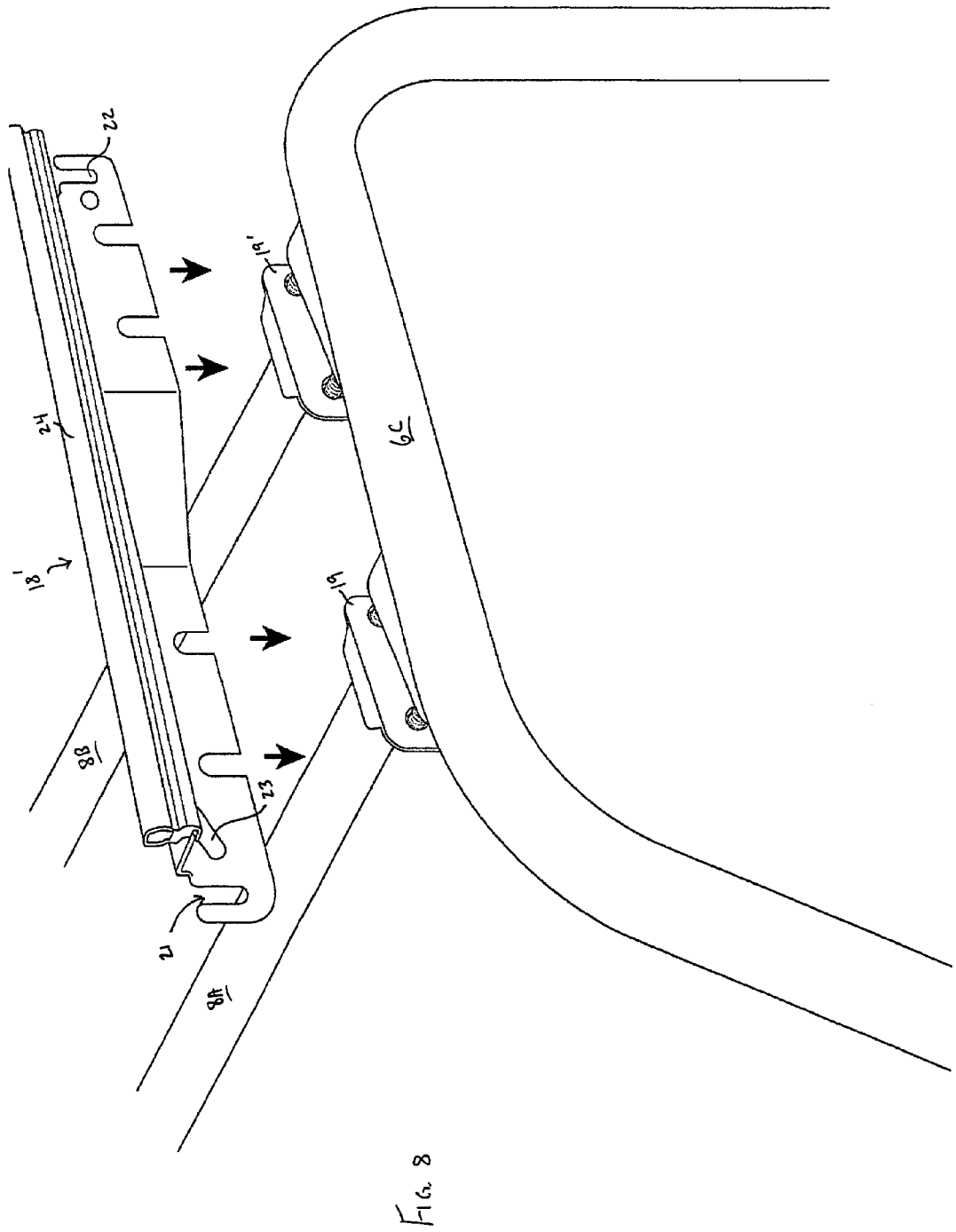
FIG. 8 is a perspective view of a second roof bracket being attached to a post of a vehicle in accordance with certain embodiments.

FIGS. 7 and 8 illustrate the attachment of roof brackets 18, 18' between the lateral members 8A, 8B ad top portions 6C, 7C of the roll over protection structure. Thus, bolts 122 that secure the lateral members 8A, 8B to the top portions 6C, 7C are loosened or removed, and the slotted brackets 18, 18' are slipped into place between end plates 19, 19' on each side of the lateral members 8A, 8B. The bolts 122 are then tightened, or reinserted and tightened, thereby securing bracket 18 between the end plates 19, 19' and the top portion 7C, and bracket 18' between the end plates 19, 19' and the top portion 6C. The brackets could also be secured to the inside or outside surface of the roll over protection structure, if desired. The brackets should be made of a rigid and durable material, such as mild steel, hard plastic or composites. Like pins 13, the brackets are attached without compromising the integrity of the roll over protection system, by using existing structure and not creating any additional holes or other weak points in the bars. Preferably the brackets 18 are made of a resilient, durable material such as steel or hard plastic.

Each roof bracket 18, 18' includes a striker pin 113 having a cylindrical pin body and terminating in a pin head having a larger diameter than the pin body. In the exemplary embodiment shown, the pins 113 extend laterally inwardly and are positioned and configured to be received by a corresponding roof latch as discussed in greater detail below. Each roof bracket 18, 18' also includes a forward slot 21, positioned and shaped to receive a corresponding pin on the windshield, a rear slot 22, positioned and shaped to receive a corresponding pin on the rear panel, and an angled roof slot 23, positioned and shaped to receive a corresponding pin on the roof. Each bracket 18, 18' may also include a seal or other weather stripping 24, which is compressed under the weight of the roof and helps weatherproof the interior of the cab.

Figure 9:
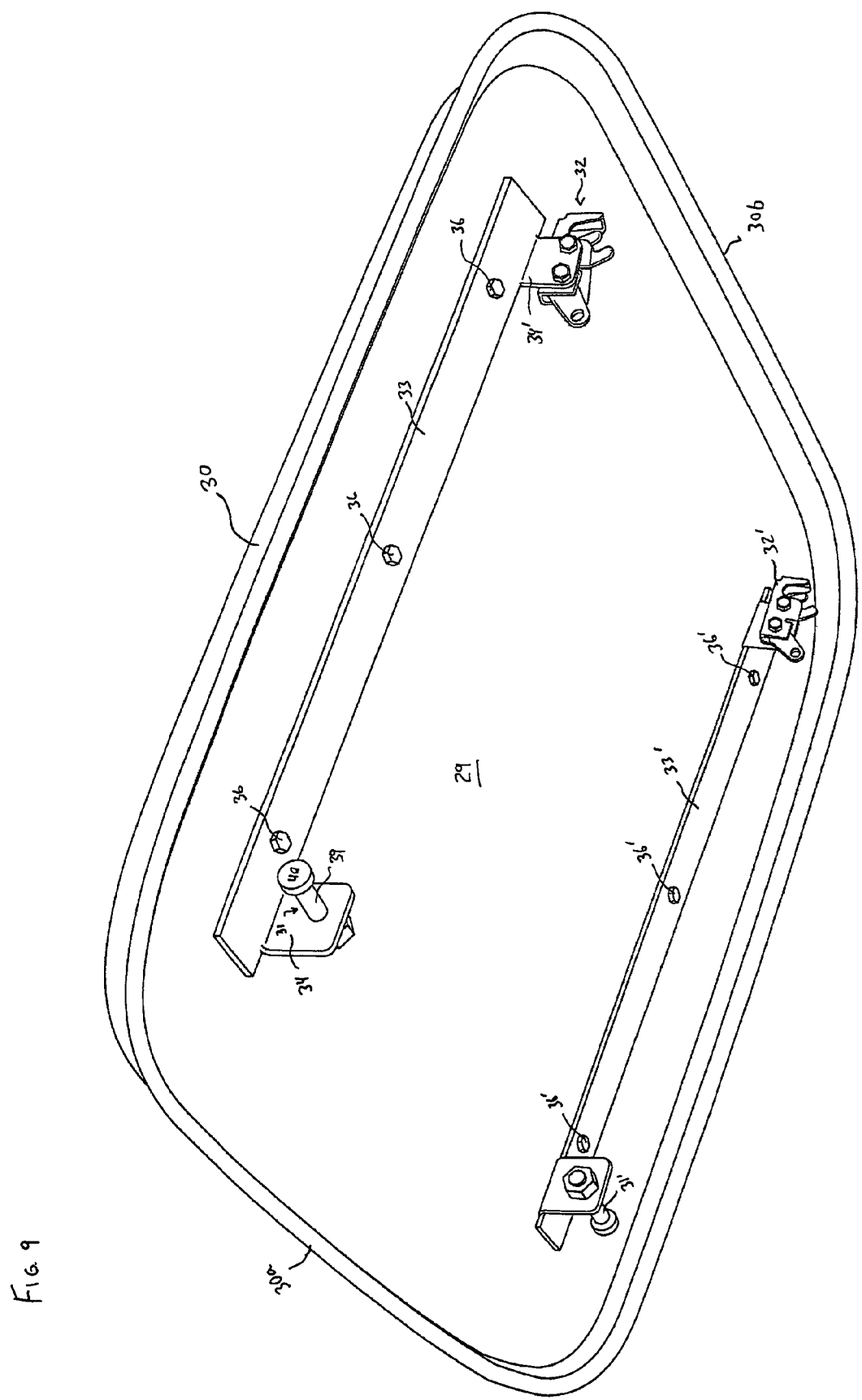
FIG. 9 is a perspective view a roof of a cab assembly in accordance with certain embodiments.

FIG. 9 illustrates a typical roof 30 for a cab in accordance with certain embodiments. The roof 30 includes a roof body and has been equipped with a first front pin 31 that extends downwardly from the undersurface 29 of the roof 30, and a first rear latch 32 that also extends downwardly from the undersurface 29. The latch 32 is spaced longitudinally from the front pin 31 as shown. In the exemplary embodiment shown, each latch 32 is a rotary latch that is triggered by a striker pin.

Bar 33, with downwardly extending flanges 34, 34', can be used to attach the pin 31 and the latch 32 to the underside 29 of the roof 30. Bar 33 can be attached to the roof by any suitable means, such as bolts 36. A second bar 33', laterally spaced from the first bar 33, is also provided and holds a second front pin 31' and a second spaced rear latch 32' as shown. The bars should be made of a rigid and durable material, such as mild steel, hard plastic or composites. Bolts 36' secure the bar 33' to the underside 29 of the roof 30. Preferably the pins 31, 31' are positioned so that they are equidistant from the front 30a of the roof, and the latches 32, 32' are positioned so that they are equidistance from the rear 30b of the roof. Similarly, preferably the pins 31, 31' are each positioned about the same lateral distance from the respective sides of the roof, as are the latches 32, 32'. The pins define a pivot axis about which the roof body can pivot with respect to the vehicle when the pins 31, 31' are received by corresponding respective slots on the vehicle. Those skilled in the art will appreciate that although each pin 31, 31' is shown having a cylindrical pin body 39 and a pin head 40 extending therefrom and having a larger diameter than the body 39, other configurations are possible and within the scope of the invention. The diameter and length of each pin body 39 are configured to be received by a corresponding pin slot, or by a corresponding latch, as discussed in greater detail below. When received by a pin slot, the pin head of larger diameter acts as a stop, limiting lateral movement of the pin when in the slot-received position. Although the pins are shown near the front 31a of the roof and the latches near the rear 30b, the precise location of the pins and latches is not particularly limited. For example, the pins could be near the rear 30b and the latches near the front 30a. Also, although bars 33, 33' extend in the longitudinal direction, they could be laterally placed such that a front bar supports the pins 31, 31' and a rear bar supports the latches 32, 32'.

Figure 2:
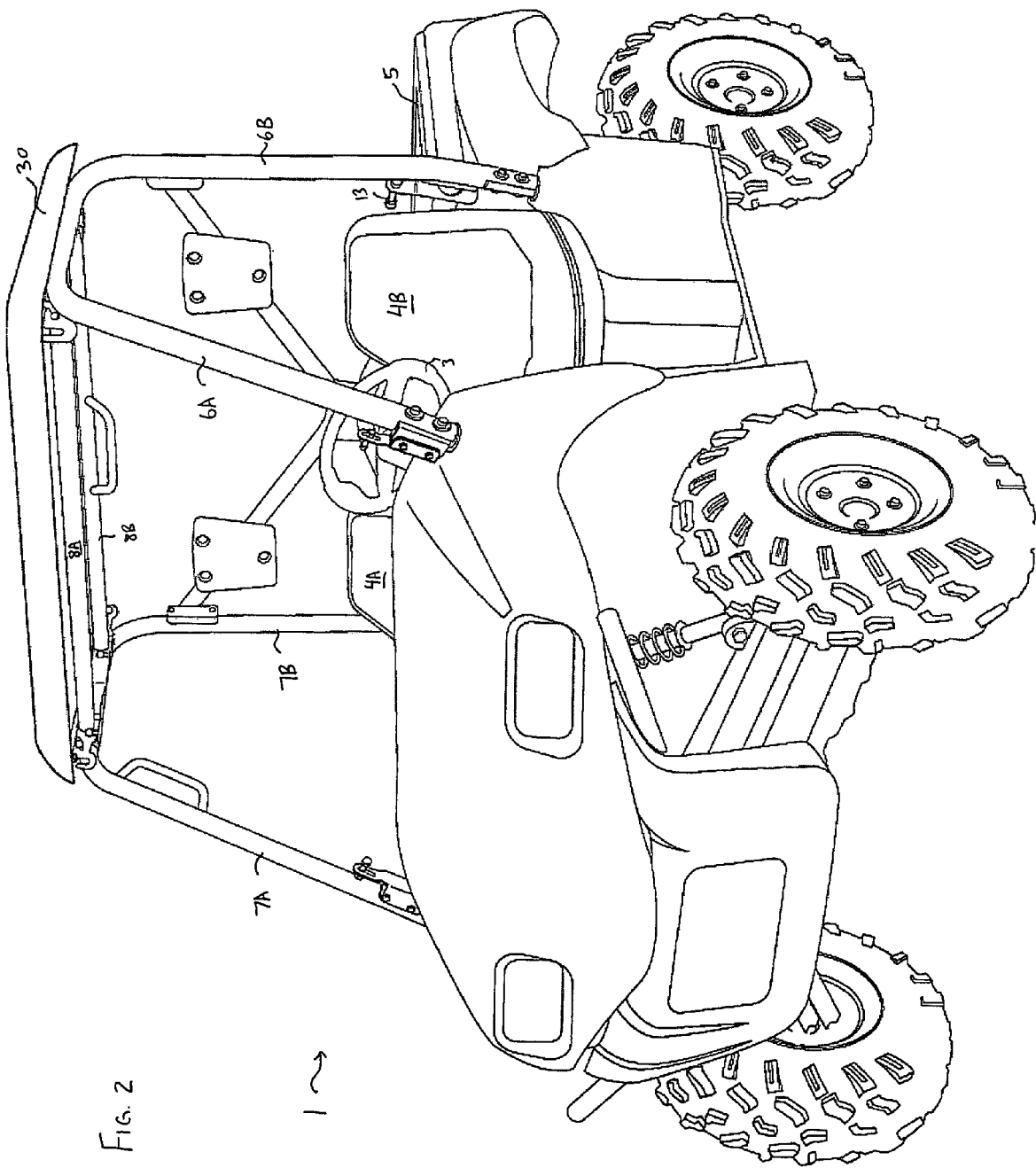
FIG. 2 is a perspective view the vehicle of FIG. 1 with a roof attached in accordance with certain embodiments.
Figure 5:
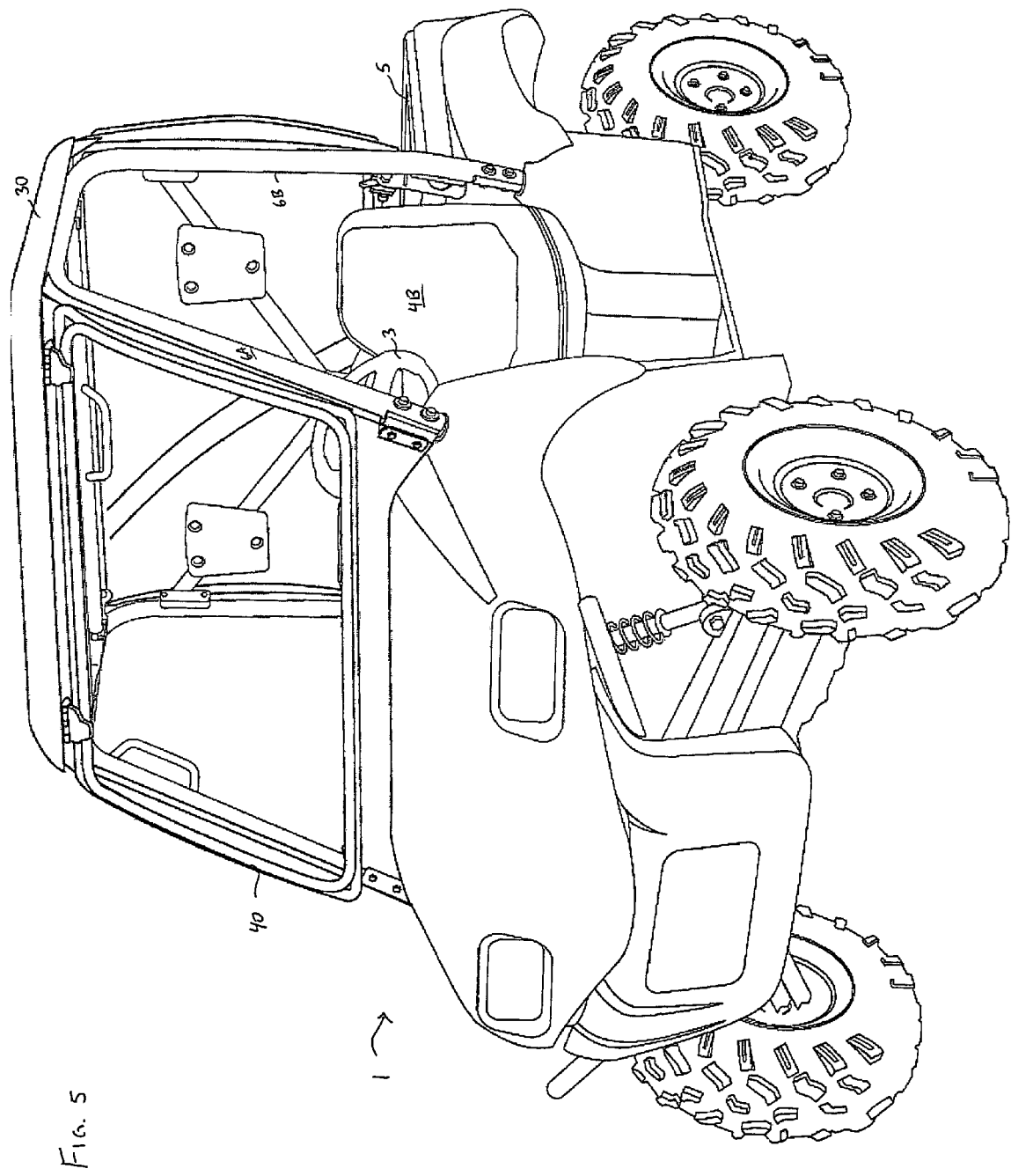
FIG. 5 is a perspective view of the vehicle of FIG. 1 with a windshield, roof and rear panel attached in accordance with certain embodiments.
Figure 10:
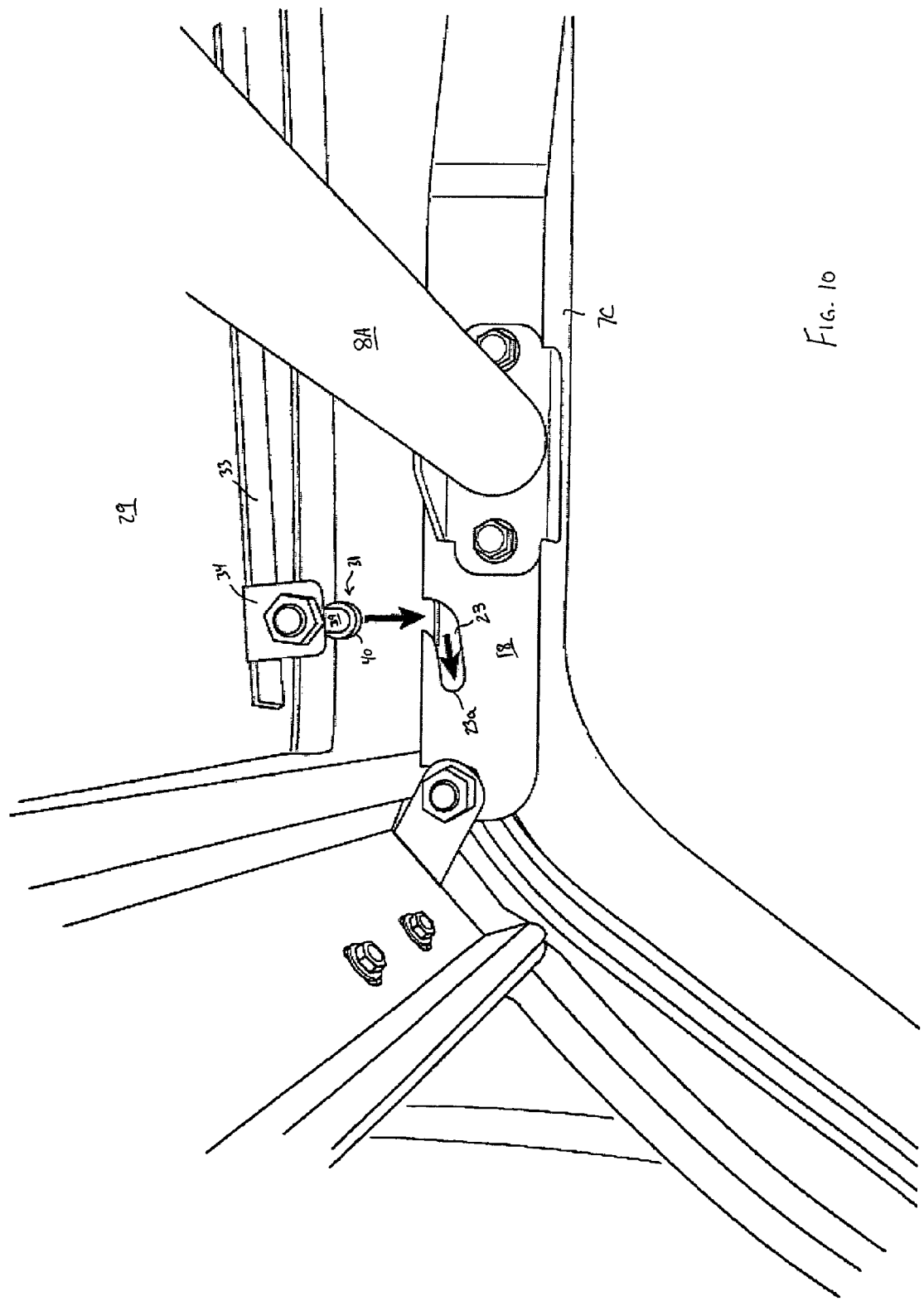
FIG. 10 is a perspective view of the front portion of a roof just prior to engagement with the vehicle in accordance with certain embodiments.
Figure 11:
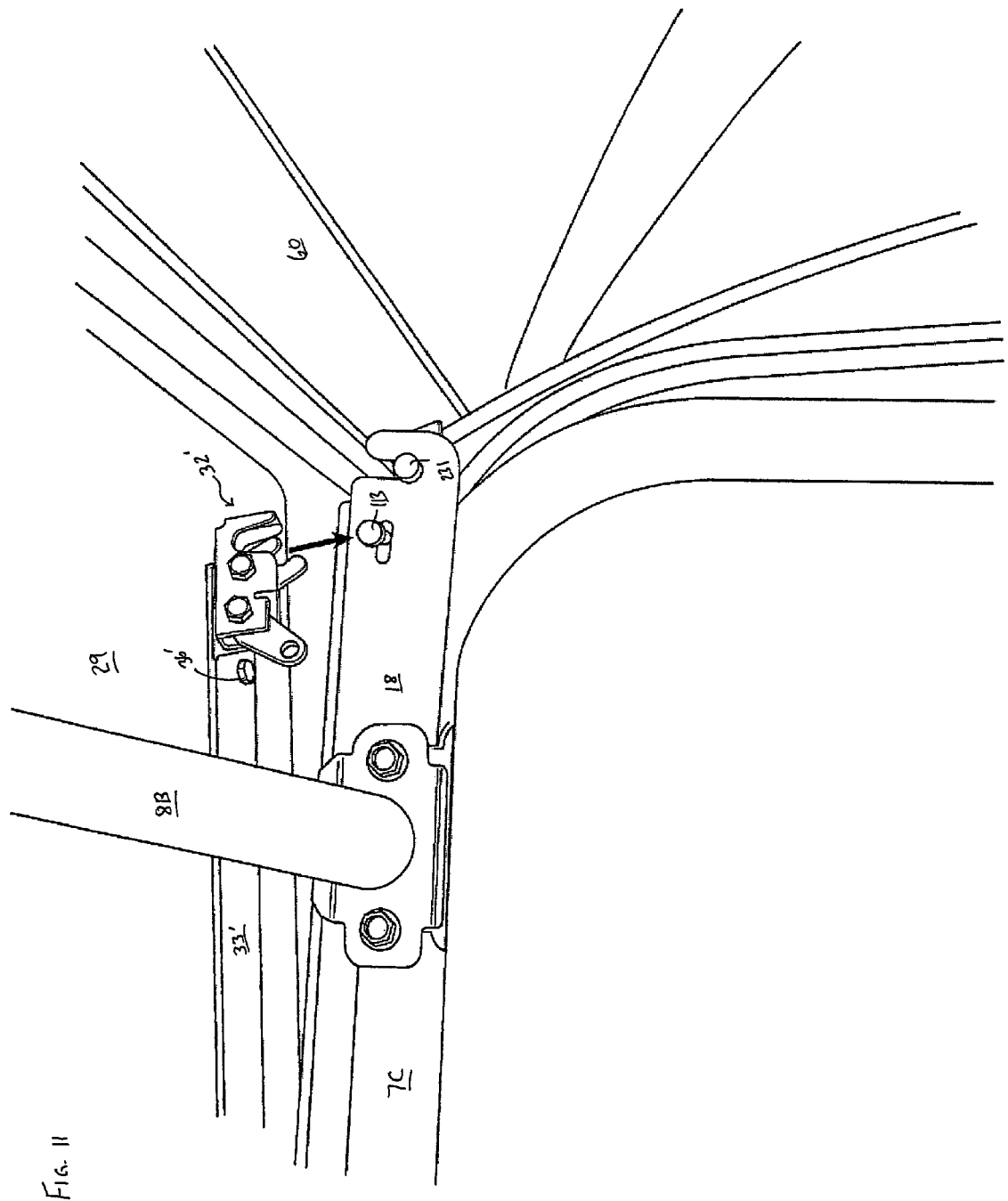
FIG. 11 is a perspective view of the rear portion of a roof just prior to engagement with the vehicle in accordance with certain embodiments.

FIG. 10 illustrates the insertion of front pin 31 extending from roof 30 into a corresponding slot 23 in bracket 18. Preferably each slot 23 is angled to facilitate insertion of the front pins. To attach the roof 30, the roof 30 is positioned above the brackets 18, 18', and held at an angle such that the rear of the roof 30 is held higher than the front. The pins 31, 31' are then inserted into respective slots 23 in the brackets 18, 18' and the roof is pushed forward (towards the front of the vehicle) until the body of each pin 31, 31' engages the end 23a of each respective slot 23. Once the pins 31, 31' are so received by the slots 23, the roof 30 is pivoted on the pivot axis defined by the pins 31, 31' and the rear of the roof is lowered so that the latches 32, 32' can engage striker pins 113 on each bracket 18, 18', as best seen in FIG. 11, and lock the roof in place. FIGS. 2 and 5 show the roof 30 in its attached position on the vehicle 1. Again, the pins and latches could be reversed, so that the rear of the roof is attached first, followed by the roof front.

Figure 3:
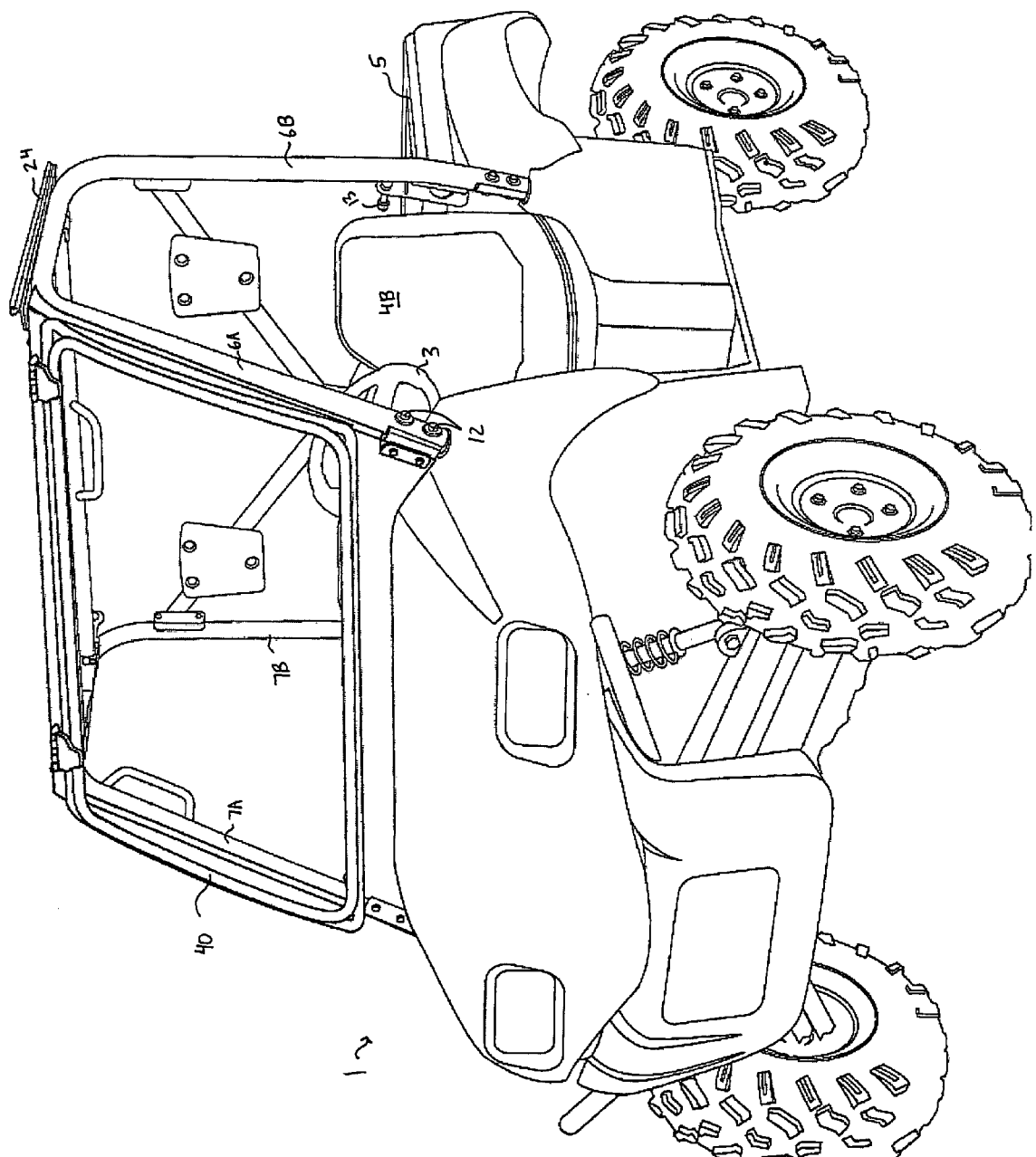
FIG. 3 is a perspective view of the vehicle of FIG. 1 with a windshield attached in accordance with certain embodiments.
Figure 12:
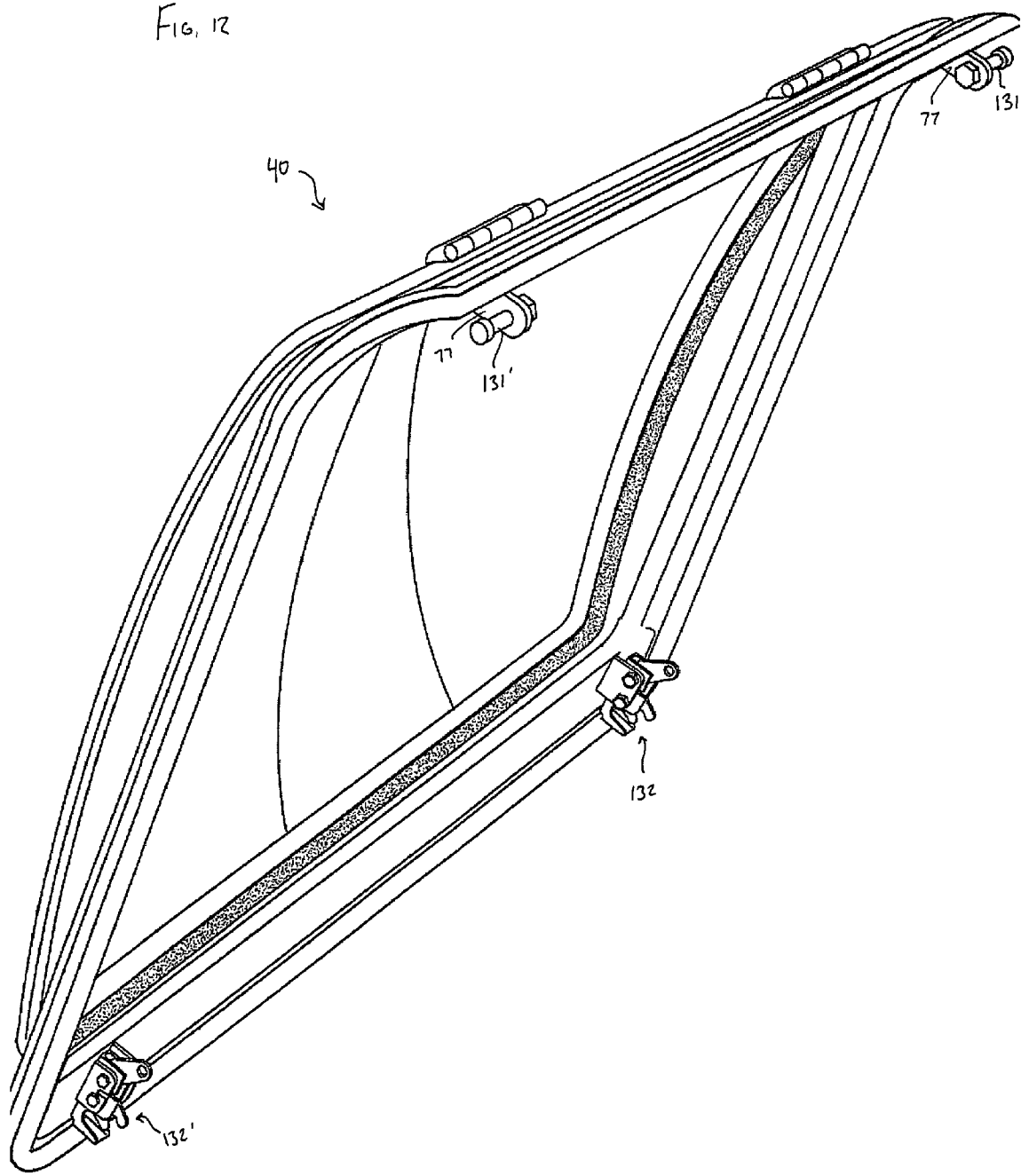
FIG. 12 is a perspective view of the inside of a windshield in accordance with certain embodiments.
Figure 13:
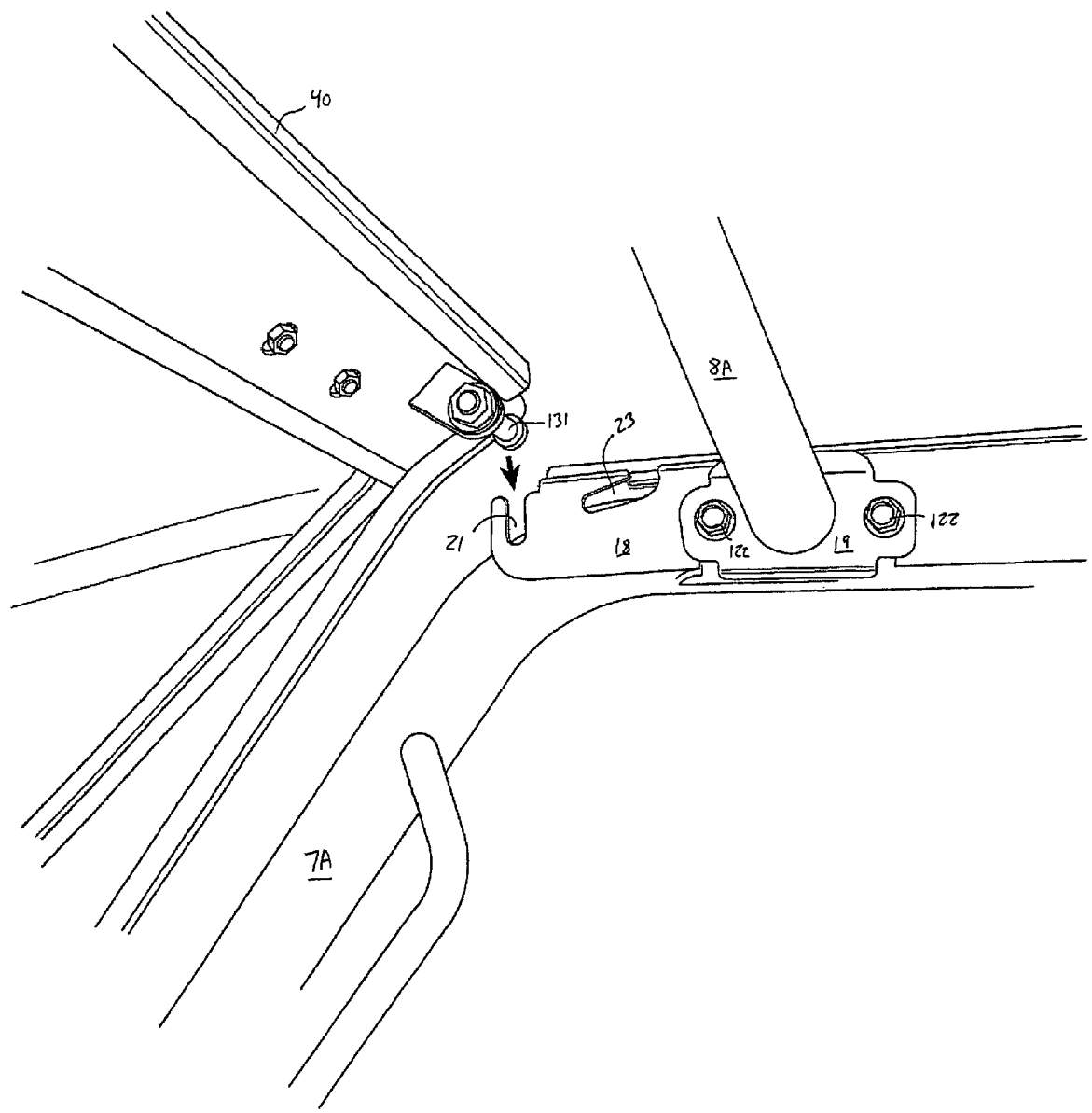
FIG. 13 is a perspective view of a top portion of a windshield just prior to engagement with the vehicle in accordance with certain embodiments.
Figure 14:
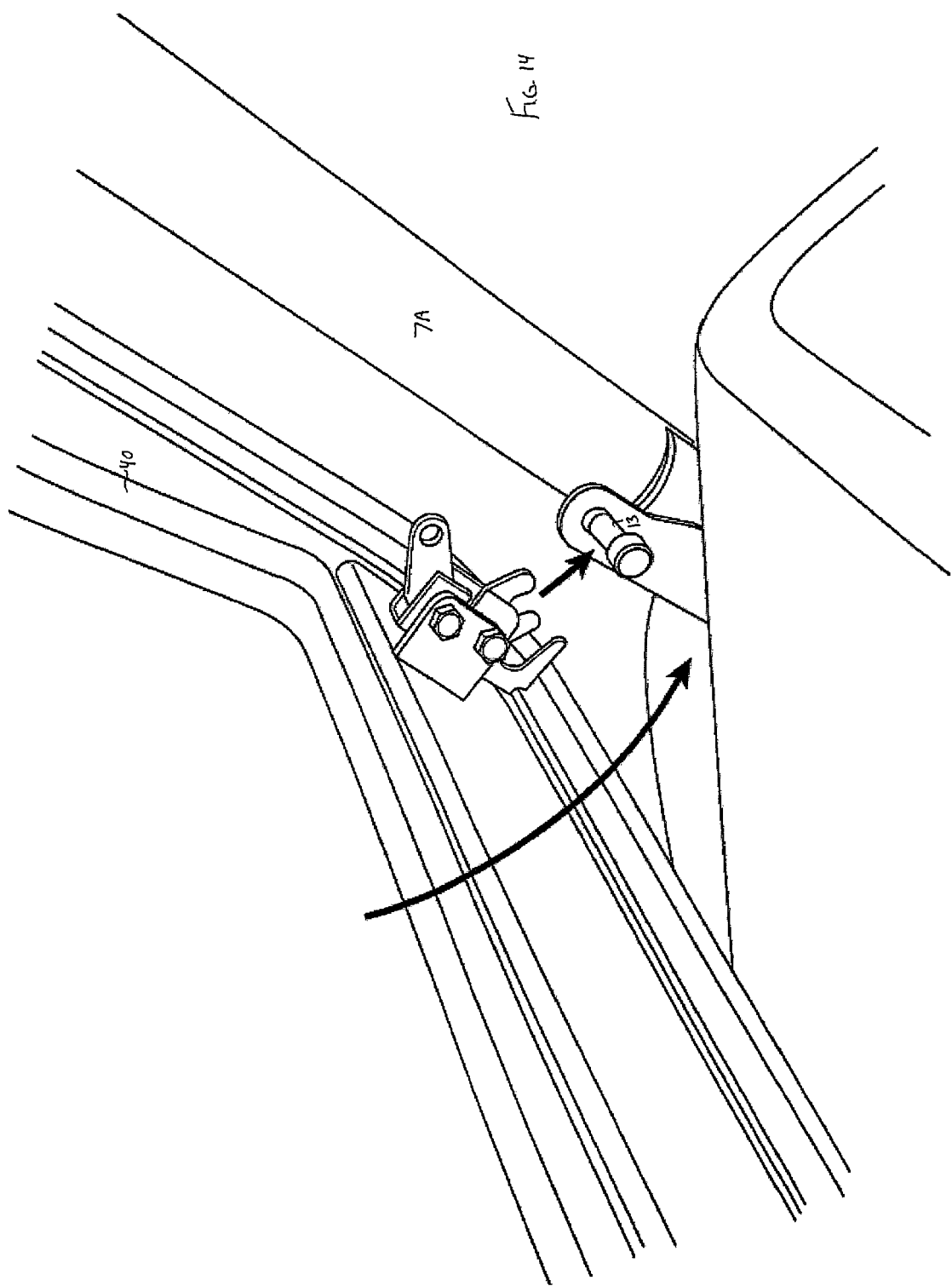
FIG. 14 is a perspective view of a bottom portion of a windshield just prior to engagement with the vehicle in accordance with certain embodiments.

The windshield 40 and rear panel 60 are attached to the vehicle in a similar manner. Specifically, with reference to FIG. 12, the windshield 40 includes a body having first upper pin 131 and a laterally spaced second upper pin 131' affixed to the windshield 40 with brackets 77. Each upper pin 131, 131' extends laterally outwardly and terminates in a pin head as shown. Depending upon the configuration of the roll over protection structure of a particular vehicle, the pins could extend laterally inwardly. The pins 131, 131' define a windshield pivot axis. A pair of spaced latches 132, 132' are affixed to the lower portion of the windshield 40, one each below a respective upper pin 131, 131'. Each upper pin 131, 131' is received in a respective front slot 21 in roof bracket 18, 18' to mount the windshield onto the vehicle, as shown in FIG. 13. Once the upper pins 131, 131' are received in respective slots 21, the windshield 40 is pivoted on the upper pins 131, 131' about the pivot axis, and the lower end of the windshield 40 is swung towards the vehicle as shown by the arrows in FIG. 14, so that each of the spaced lower latches 132, 132' on the windshield 40 engages a respective striker pin 13 on posts 6A, 7A and locks the windshield in place (FIGS. 3 and 5). Again, the location of the pins 131, 131' and latches 132, 132' could be reversed.

Figure 15:
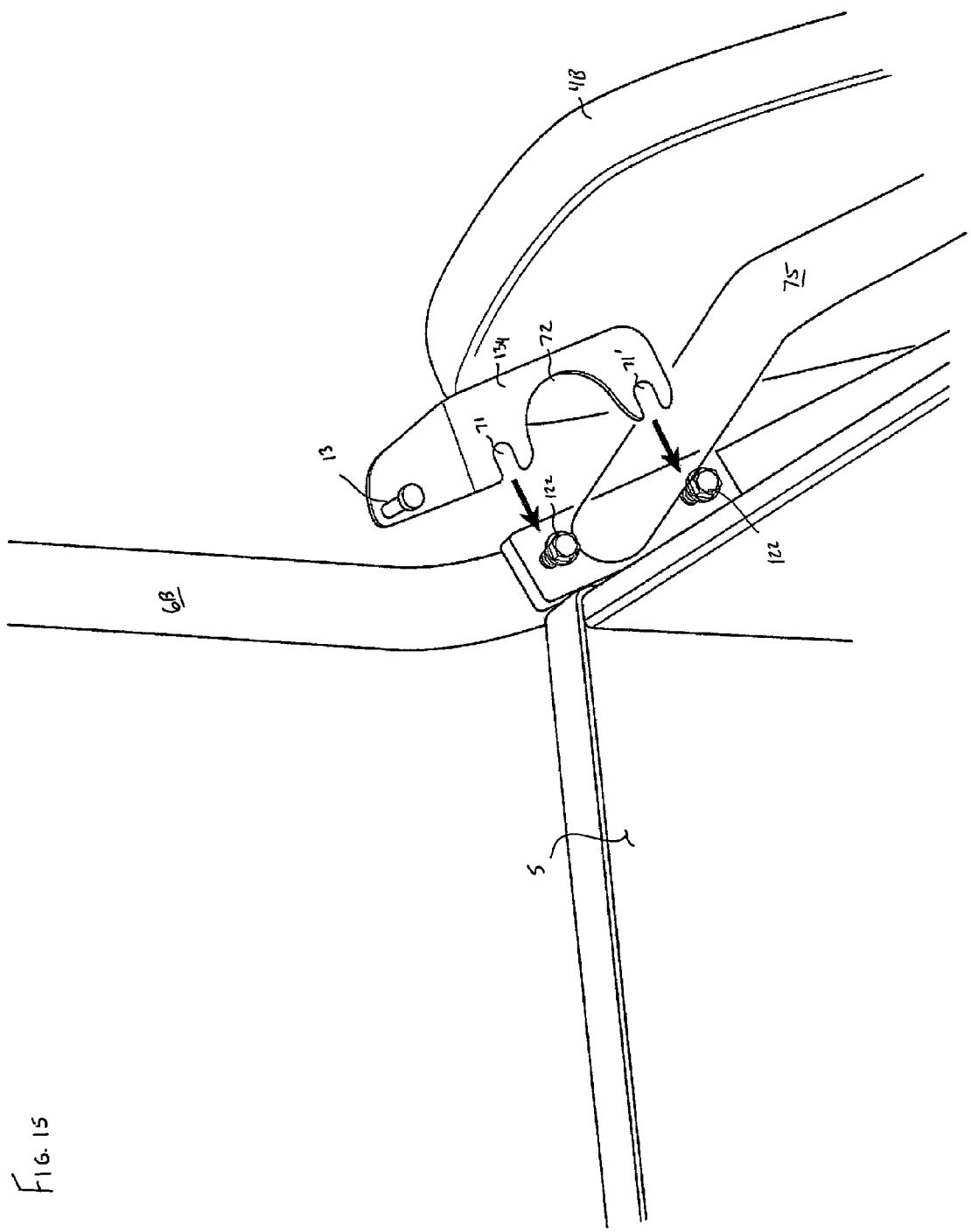
FIG. 15 is a perspective view of a rear panel bracket being attached to a post of the vehicle in accordance with certain embodiments.

FIG. 15 illustrates an exemplary attachment of striker pin 13 to the post 6B. Bracket 134 to which striker pin 13 is attached includes slots 71, 71' that slide around loosened bolts 122. Tightening of the bolts 122 secures the bracket 134 to the post 6B. The bracket 134 may also include an arcuate cutout 72 to accommodate bar 75 that is located between the seats 4A, 4B.

Figure 4:
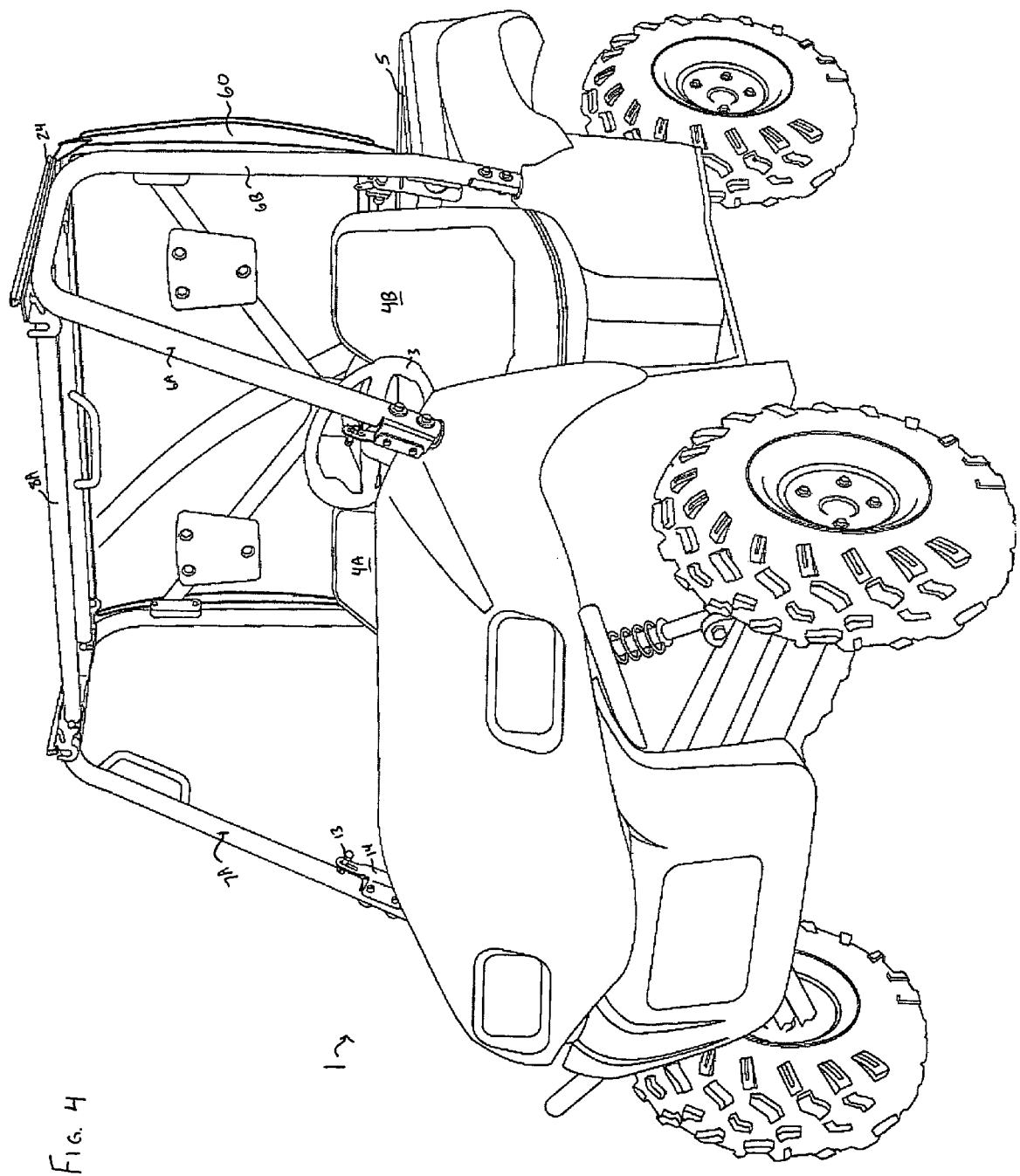
FIG. 4 is a perspective view of the vehicle of FIG. 1 with a rear panel attached in accordance with certain embodiments.
Figure 16:
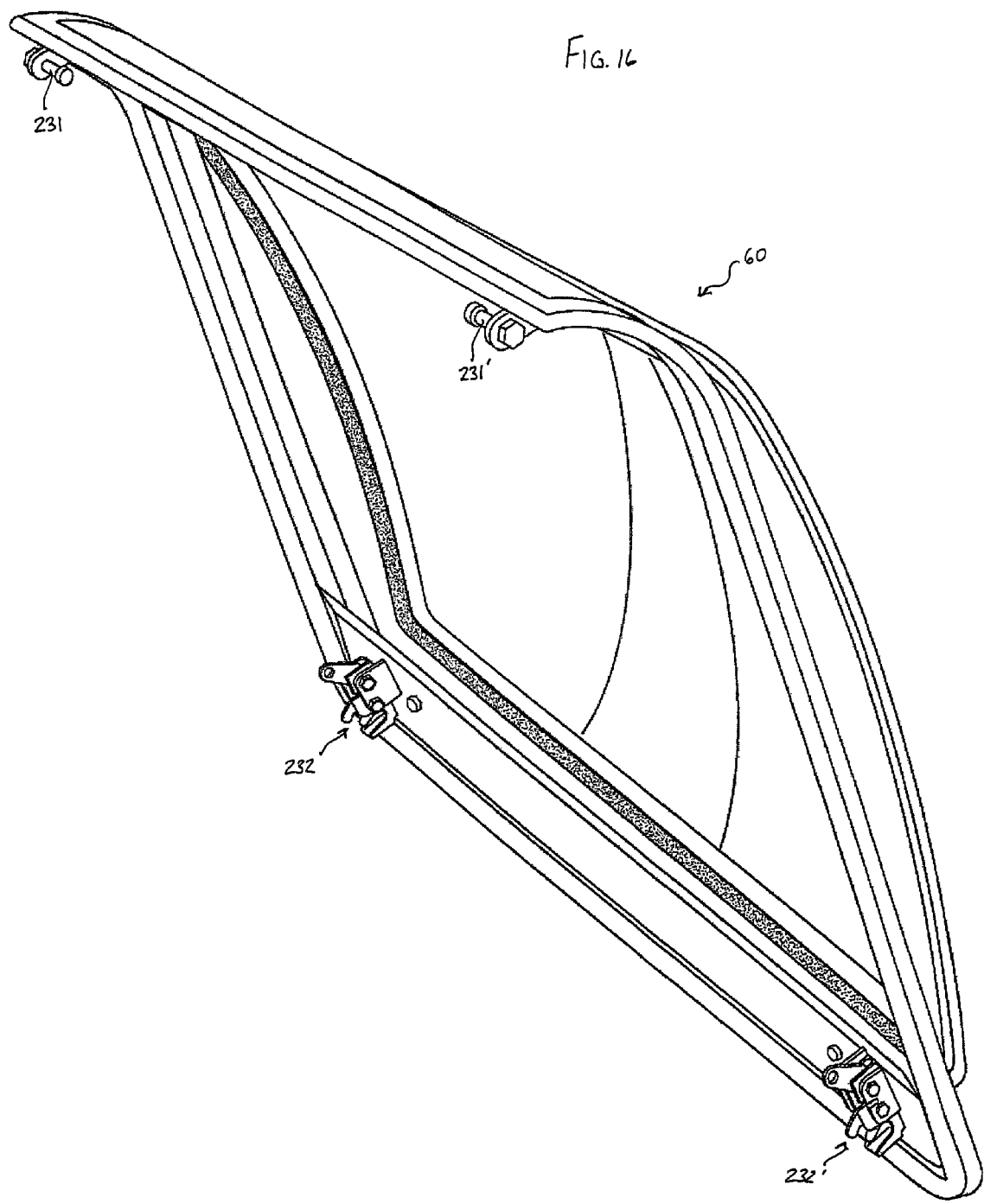
FIG. 16 is a perspective view of the inside of a rear panel in accordance with certain embodiments.
Figure 17:
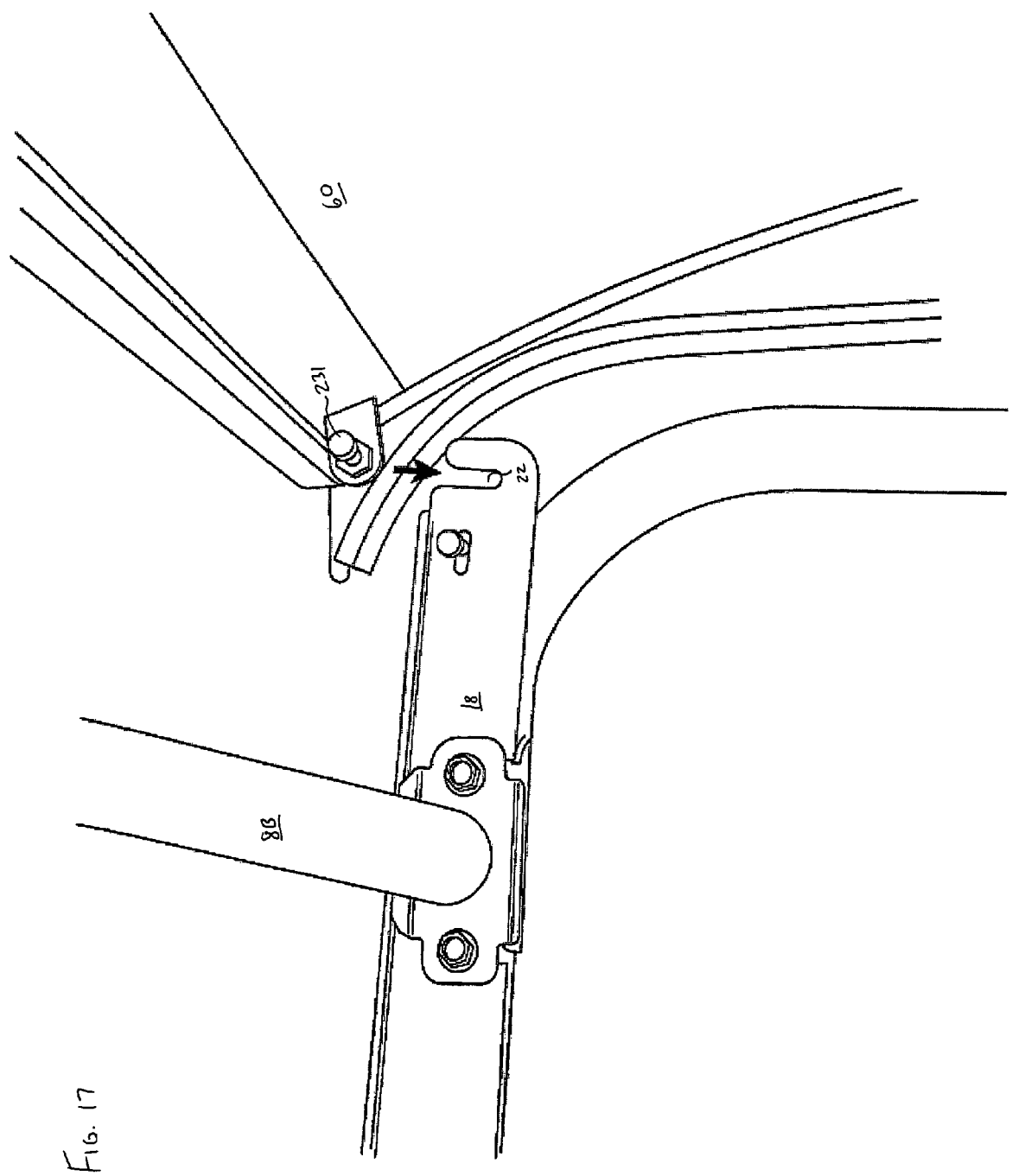
FIG. 17 is a perspective view of a portion of the rear panel just prior to engagement with the vehicle in accordance with certain embodiments.
Figure 18:
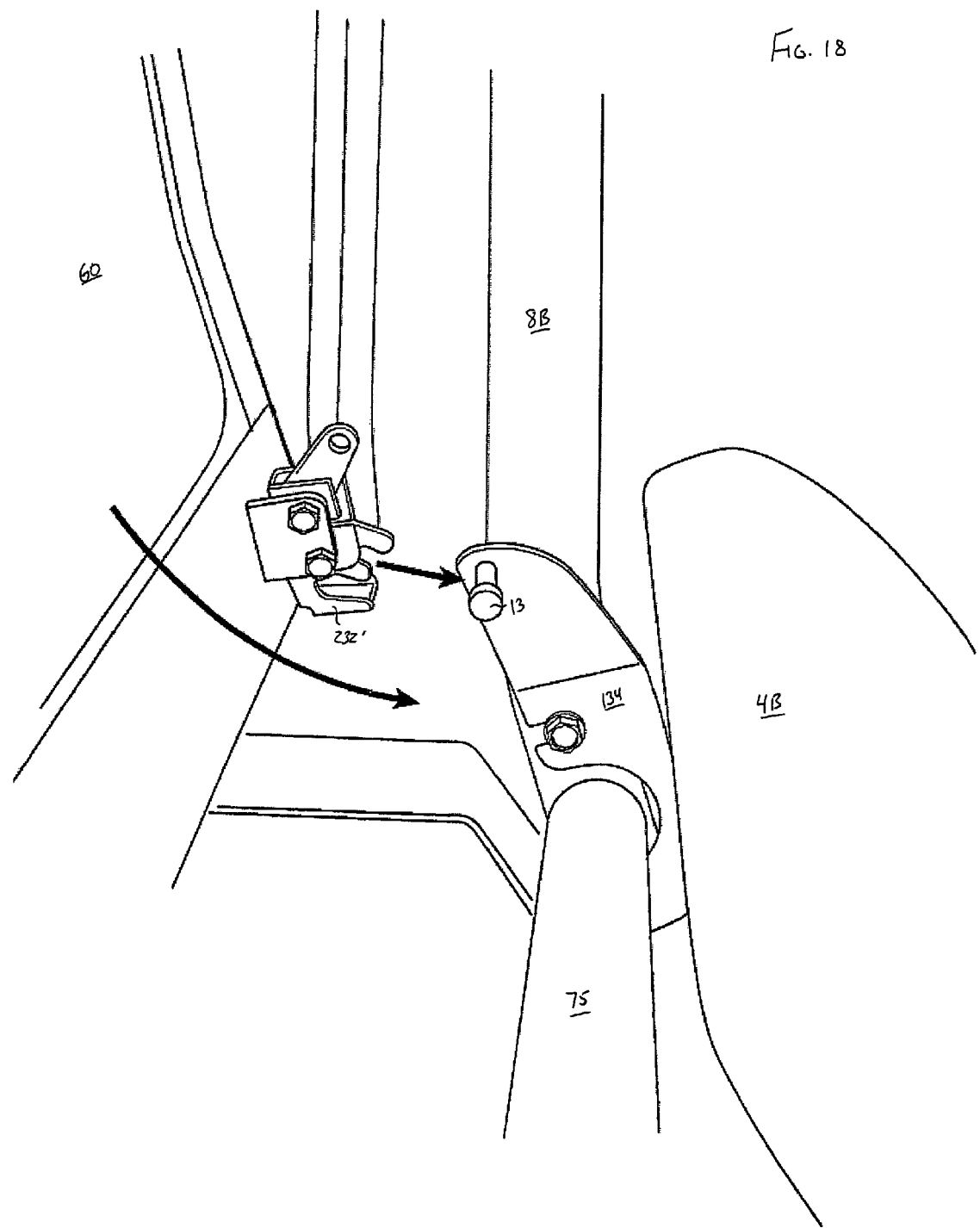
FIG. 18 is a perspective view of a portion of the rear panel just prior to engagement with the vehicle in accordance with certain embodiments.

With reference to FIGS. 16 and 17, the rear panel 60 includes a body having first upper pin 231 and a laterally spaced second upper pin 231'. Each upper pin 231, 231' extends laterally inwardly and terminates in a pin head as shown. Depending upon the configuration of the roll over protection structure of a particular vehicle, the pins could extend laterally outwardly. The pins 231, 231' define a rear panel pivot axis. A pair of spaced latches 232, 232' are affixed to the lower portion of the rear panel 60, one each below a respective upper pin 231, 231'. Each upper pin 231, 231' is received in a respective rear slot 22 in roof bracket 18, 18'. Once the upper pins 231, 231' are received in respective slots 22, the rear panel 60 is pivoted on the upper pins 231, 231' about the pivot axis, and the lower end of the rear panel 60 is swung towards the vehicle as shown by the arrows in FIG. 18, so that each of the spaced lower latches on the rear panel 60 engage a respective striker pin 13 on posts 6B, 7B and lock the rear panel in place (FIGS. 4 and 5). As was the case with the windshield 40 and roof 30, the location of the pins 231, 231' and latches 232, 232' could be reversed.

Figure 19:
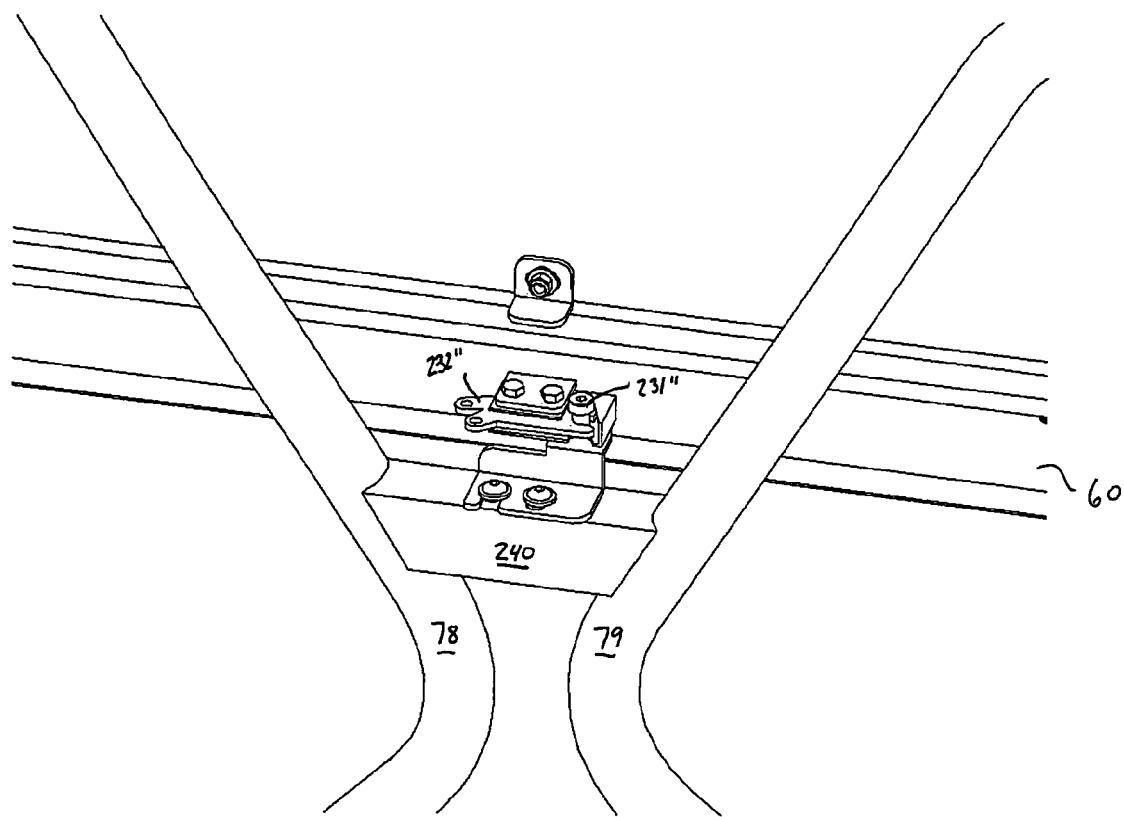
FIG. 19 is a perspective view of a portion of the rear panel engaged with the vehicle in accordance with certain embodiments.

Alternatively, rear panel 60 could include a single latch 232" centrally located along the lower edge of the panel as shown in FIG. 19. A corresponding striker pin 231" can be affixed to the bracket 240 connecting bars 78, 79 of the roll over structure as shown.

Providing with the windshield, roof and rear panel as separate components allows for the selective attachment and removable of each individual component. For example, a passenger may desire to travel in the vehicle with only a roof, or with only a windshield, or with a roof and windshield but no rear panel, or with any other combination of roof, windshield and rear panel. Since the windshield, roof and rear panel can be independently attachable and detachable from the vehicle, selectively using one or more of these cab components is easily achieved. However, where desired, one of more of the components can be integral to another, such as a single windshield/roof component or a single rear/panel roof component.

To remove each cab component from the vehicle, the latches are manually actuated to release the striker pins held thereby. The attachment process is then reversed, by pivoting the component about the striker pins and removing those pins from their corresponding slots. The components can then be stored for future use, or carried in the bed of the vehicle if desired.

What is claimed is:

1. A quick connect/disconnect cab assembly for mounting to a vehicle having a roll over protection structure encompassing a cab, comprising:
 a roof;
 a windshield;
 a rear panel; and
 a fastening system for removably attaching said roof, windshield and rear panel to said roll over protection structure, said fastening system comprising a plurality of latches and a plurality of striker pins, each of said latches and striker pins being configured and arranged on one of said roof, said windshield and said rear panel of said roll over protection structure, such that each of said latches is associated with a corresponding striker pin for engagement of that pin in said latch to couple said roof, windshield and rear panel to said roll over protection structure; and at least one pivot pin positioned on one of said roof, windshield or rear panel so as to engage a corresponding slot on said roll over protection structure, said at least one pivot pin defining a pivot axis about which the one of said roof, windshield or rear panel on which said at least one pivot pin is positioned pivots, with respect to said roll over protection structure, when said at least one pivot pin is in said slot.

2. The quick connect/disconnect cab assembly of claim 1 wherein the striker pins are on said roll over protection structure of said vehicle.

3. The quick connect/disconnect cab assembly vehicle of claim 1, wherein said vehicle is one of a 2-wheel drive, 4-wheel drive or all-wheel drive capable vehicle.

4. The quick connect/disconnect cab assembly of claim 1, wherein each of said latches is a rotary latch.

5. A method of quick-attaching one of a windshield, roof and rear panel to a roll over protection structure encompassing a cab, comprising:
   providing one of a windshield, roof and rear panel having at least one latch and at least one pin;
   providing a slot on said roll over protection structure arranged to receive said at least one pin;
   providing a striker pin on said vehicle arranged to engage said at least one latch;
   inserting said at least one pin in said slot;
   pivoting one of said windshield, roof and rear panel about said at least one pin in said slot in a direction towards said roll over protection structure so as to align said at least one latch with said striker pin; and
   causing said striker pin to engage said latch and thereby couple one of said windshield, roof and rear panel to said roll over protection structure.

6. The method of claim 5, wherein there are at least two laterally spaced pins on said windshield, roof or rear panel, said at least two laterally spaced pins defining a pivot axis, and wherein said step of pivoting one of said windshield, roof or rear panel pivots about said pivot axis.

7. The method of claim 6, further comprising detaching one of said windshield, roof or rear panel from said roll over protection structure by disengaging said at least one latch from a corresponding striker pin, and removing each said pin from its corresponding slot.

8. A windshield, roof or rear panel for a cage bounding a vehicle cab, comprising a body, and at least one latch and at least one pin on said body, said at least one latch adapted to engage a corresponding striker pin on said cage, and said at least one pin adapted to be received by a corresponding slot on said cage, wherein there are at least two laterally spaced pins on said body, said pins defining a pivot axis, and wherein said body is adapted to pivot about said pivot axis when said pins are received by corresponding slots on said cage.

9. A removable cab kit for a roll over protection structure encompassing a cab, comprising, as individual components, a windshield, a rear panel and a roof, wherein each of said individual components comprises a body having a fastening system for removably attachment of said individual component to said roll over protection structure , said fastening system comprising a plurality of latches and a plurality of pins, each of said latches and pins being configured and arranged on one of said roof, said windshield and said rear panel or said roll over protection structure, such that each of said latches is associated with a corresponding pin for engagement of that pin in said latch to couple said roof, windshield and rear panel to said roll over protection structure; each of said windshield, rear panel and roof further comprising at least one pivot pin for engagement with a corresponding slot on said roll over protection structure, said at least one pivot pin defining a pivot axis about which said roof, windshield or rear panel on which said at least one pivot pin is positioned pivots, with respect to said roll over protection structure, when said at least one pivot pin is in said slot.

* * * * *